(12) United States Patent
Abu-Nimeh

(10) Patent No.: US 12,506,749 B2
(45) Date of Patent: *Dec. 23, 2025

(54) SYSTEM AND METHOD FOR THE AUTOMATED DETECTION AND PREDICTION OF ONLINE THREATS

(71) Applicant: SECLYTICS, INC., San Diego, CA (US)

(72) Inventor: Saeed Abu-Nimeh, Santa Clara, CA (US)

(73) Assignee: Seclytics, Inc., San Diego, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 17/406,015

(22) Filed: Aug. 18, 2021

(65) Prior Publication Data
US 2021/0385236 A1    Dec. 9, 2021

Related U.S. Application Data

(63) Continuation of application No. 14/807,827, filed on Jul. 23, 2015, now Pat. No. 11,122,058.

(60) Provisional application No. 62/028,197, filed on Jul. 23, 2014.

(51) Int. Cl.
| | | |
|---|---|---|
| H04L 29/06 | (2006.01) | |
| G06F 16/2457 | (2019.01) | |
| G06F 16/28 | (2019.01) | |
| G06F 17/00 | (2019.01) | |
| G06F 21/55 | (2013.01) | |
| H04L 9/40 | (2022.01) | |
| G06N 20/00 | (2019.01) | |

(52) U.S. Cl.
CPC .... *H04L 63/1416* (2013.01); *G06F 16/24578* (2019.01); *G06F 16/285* (2019.01); *G06F 21/552* (2013.01); *H04L 63/1433* (2013.01); *G06N 20/00* (2019.01)

(58) Field of Classification Search
CPC ............. H04L 63/1416; H04L 63/1433; G06F 16/285; G06F 16/24578; G06F 21/552; G06N 20/00
See application file for complete search history.

(56) References Cited

U.S. PATENT DOCUMENTS

| | | | |
|---|---|---|---|
| 7,823,202 B1 * | 10/2010 | Nucci | H04L 63/1408 709/224 |
| 9,191,403 B2 | 11/2015 | Zoldi et al. | |
| 2009/0094697 A1 * | 4/2009 | Provos | G06F 21/577 706/12 |
| 2009/0126023 A1 * | 5/2009 | Yun | H04L 63/1433 726/25 |

(Continued)

*Primary Examiner* — Noura Zoubair
(74) *Attorney, Agent, or Firm* — Joseph A. Andelin; Fish IP Law, LLP

(57) ABSTRACT

A method for monitoring online security threats comprising of a machine-learning service that receives data related to a plurality of features related to internet traffic metrics, the service then processes said data by performing operations selected from among: an operation of ranking at least one feature, an operation of classifying at least one feature, an operation of predicting at least one feature, and an operation of clustering at least one feature, and as a result the machine learning service outputs metrics that aid in the detection, identification, and prediction of an attack.

17 Claims, 11 Drawing Sheets

(56) References Cited

U.S. PATENT DOCUMENTS

2015/0195299 A1\* 7/2015 Zoldi .................. H04L 63/1408
  726/25
2015/0286982 A1\* 10/2015 Dwyer ................. G06Q 10/067
  705/7.17

\* cited by examiner

SYSTEM AND METHOD FOR THE AUTOMATED DETECTION AND PREDICTION OF ONLINE THREATS

This application is a continuation of U.S. application Ser. No. 14/807,827, filed Jul. 23, 2015, which claims the benefit of U.S. provisional application No. 62/028,197 filed Jul. 23, 2014. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

TECHNICAL FIELD

The field of the invention is wireless communication. The present invention relates generally to online security and the prevention of malicious attacks. Specifically, the present invention relates to an automated computer system implemented for the identification, detection, prediction, and correlation of online security threats.

BACKGROUND

The background description includes information that may be useful in understanding the present invention. It is not an admission that any of the information provided herein is prior art or relevant to the presently claimed invention, or that any publication specifically or implicitly referenced is prior art.

The term "big data" is used ubiquitously these days as a synonym for the management of data sets that are well beyond the capability of an individual person. In the arena of internet security, for example, security experts are tasked with handling increasing larger amounts of threat feeds and logs ("big data") that need to be analyzed and cross referenced in order to find patterns to detect potential online threats to companies, institutions, agencies, and internet users worldwide. Currently the industry is so overwhelmed by the vast amounts information that there is a shortage of experts in the field of big data and machine learning who can tackle these challenges.

In order to make effective use of all this security data, there is also a rising demand for "Security Data Scientists". These scientists are not only highly trained data scientists, who can apply machine learning and data mining approaches to handle big data and detect patterns in them, but they are also security researchers who understand the online threat landscape and are experts in identifying and detecting Internet threats. However, finding such talent nowadays is proving extremely difficult due to the dual set of expertise that is required. Indeed, it would take an individual an entire career to become an expert in just one of these fields. Additionally, due to the exponential growth and complexity of the Internet it is proving increasingly difficult for organizations to find and retrain talented security data scientists who can help track and monitor all of the detectable and potential threats online.

Thus, what is needed is a scalable method for monitoring online threats that can scale with the growth of the Internet.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

Figure 1A:
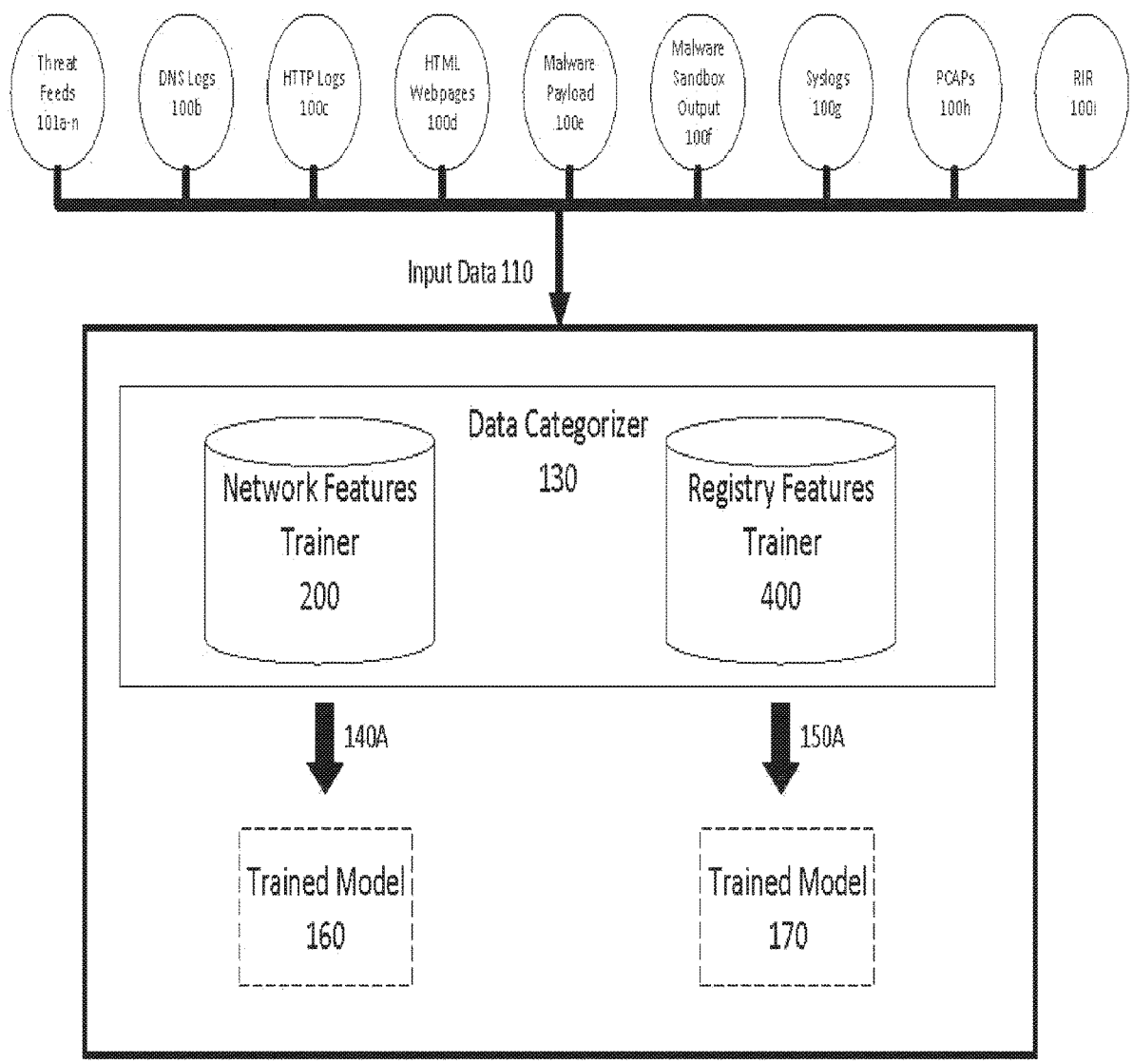
FIG. 1A is an overview of a threat plug and play platform operating in a training mode in which threat models are generated based on features aggregated from incoming internet threat data.

The present invention overcomes these human limitations through a plug and play platform that enables security researchers and analysts to apply big data and machine learning approaches to security problems at the click of a mouse. The present invention further utilizes machine learning techniques in order to harness the information provided by the platform's users and partners in order to implement a scalable computer platform for dealing with online threats. The platform and its machine learning capacities culminate to create a machine learning service that may be trained to automatically recognize suspicious patterns in internet traffic and internet registry data and to alert the appropriate users and client systems.

The machine learning service of the present invention comprises of at least four novel components: 1) a threat plug and play platform, 2) a threat identification and detection engine, 3) a threat prediction engine, and 4) a threat correlation engine. Each one of these components is described in detail in the accompanying illustrations and respective descriptions.

Various objects, features, aspects and advantages of the inventive subject matter will become more apparent from the following detailed description of preferred embodiments, along with the accompanying drawing figures in which like numerals represent like components.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Platform Overview

Figure 1B:
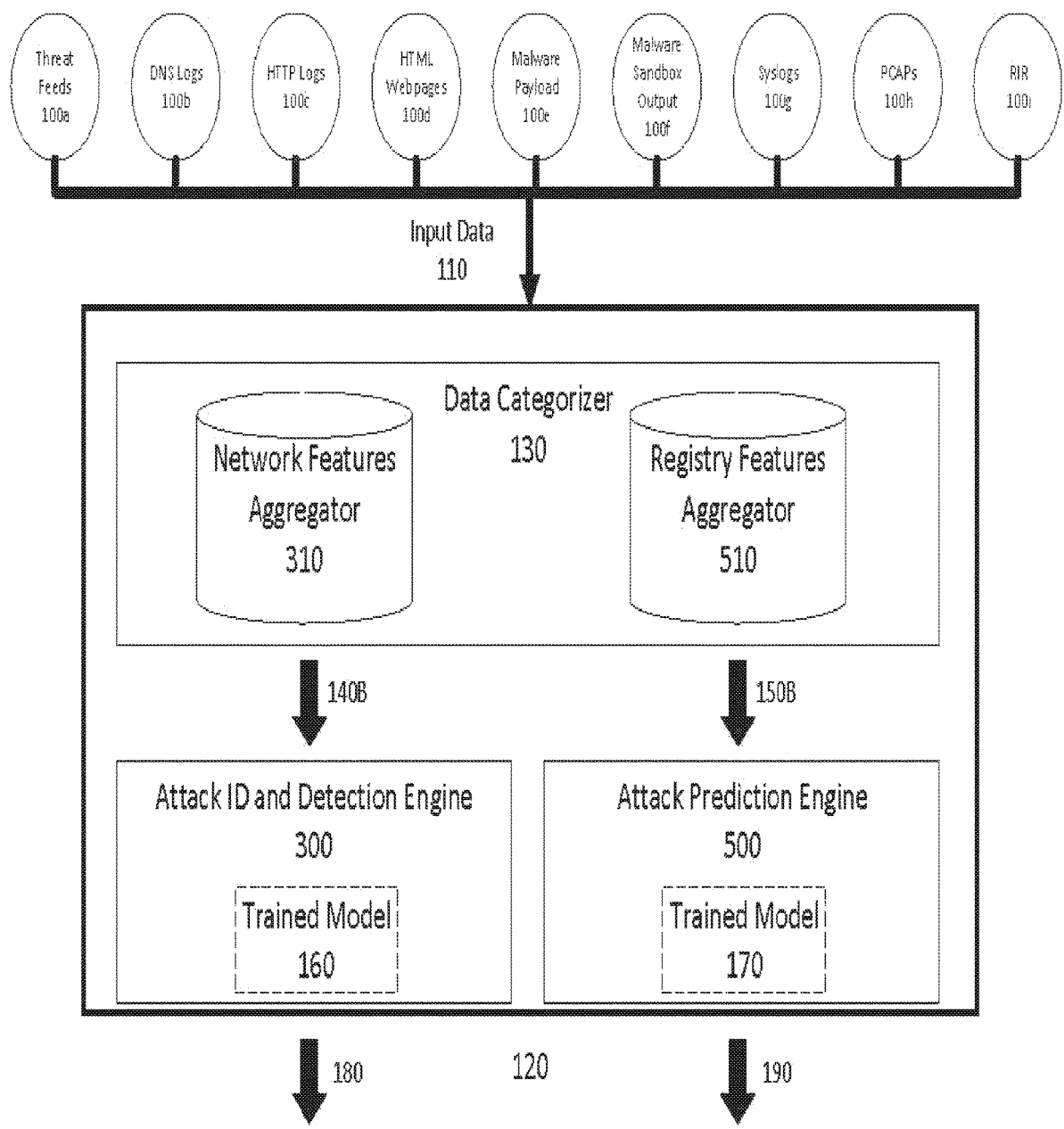
FIG. 1B is an overview of a threat plug and play platform operating in a testing mode in which incoming internet threat data is compared against existing threat models.

Applying data mining and machine learning algorithms usually requires scripting and coding as well as basic knowledge of the theory behind these algorithms. The present invention however maybe used by Internet security researchers and analysts that do not need any prior theoretical knowledge of these algorithms or even any scripting or coding skills. As depicted in FIGS. 1A-B, the platform 120 of the present invention, operating on a server, works as a security data scientist's "black box".

Machine Learning

Machine learning is a scientific discipline that explores the construction and study of algorithms that can learn from data. Such algorithms operate by building a model based on inputs and using those models to make predictions or decisions, rather than only following explicitly programmed instructions.

The present invention makes use of these types of algorithms by way of building models of "healthy" and "unhealthy" internet networks and traffic-based on past internet data—and then comparing those models against contemporaneous internet data to estimate the level of risk that is present.

FIG. 1A is an overview of a threat plug and play platform 120 operating in a "training mode" in which threat models 160 170 are generated based on features aggregated from existing internet threat data 110. With respect to the present invention, in order to implement a machine learning service in platform 120, the system must first undergo training sessions in which the threat data 110 is fed into, processed, and sorted by a data categorizer 130. Categorizer 130 is a module in which relevant features are extracted from incoming data 110 and utilized by either the network features trainer 200 or registry features trainer 400. Network related features 140A are then used to build trained models for the detection 160 of suspicious internet activity. Registry related features 150A are used to build trained models for prediction 170 of suspicious internet activity.

FIG. 1B is an overview of a threat plug and play platform 120 operating in a "testing mode" in which new incoming internet threat data and IPs 110 are compared against existing threat models 160 170 in order to identify and predict suspicious activity. In testing mode internet data 110 is fed into the platform 120, clustering and classification algorithms are run on the fly in a data categorizer 130, and are accumulated by either a network features aggregator 310 or a registry features aggregator 510. Relevant network features 140B are sent to an attack identification and detection engine 300 while relevant registry features 150B are sent to an attack prediction engine 500. Engine 300 then compares a set of features 140B of the current data 110 against the trained model 160 in order to determine scores and insights with respect to each IP 180. Similarly, engine 500 then compares a set of features 150B of the current data 110 against the trained model 170 in order to generate a predictive threat list 190. This list 190 comprises networks and IP addresses that are expected to be used in future attacks.

Data Input

The present invention is enabled by its capability to receive various sources of data inputs of different formats. In one embodiment the automated threat detection service 120 receives a package of data 110 from a user that comprises of any of a multiple sources of internet traffic data 100a-i.
[0026]
Threat Feeds 100a, are malicious IPs, network blocks, domains, or URLs that have been reported by a Computer Emergency Response Team or "CERT", sinkhole operators, mail server operators, etc. They may include a list of IP addresses, network blocks (also known as Classless Inter-Domain Routing or "CIDR"), domain names, or URLs that either participated in online attacks or were compromised by attackers. The platform 120 can read multiple formats of blacklists, including: plain text files (separated by line feeds), JSON objects, Extensible Markup Language or "XML" files, and Comma-Separated Values of "CSV" files. Zeus Tracker is an example of such an IP blacklist.

The threat detection service 120 may also accept an entire host of internet activity logs including, but not limited to, Domain Name System or "DNS" logs 100b, HTTP logs 100c, Webserver logs 100d, and Syslogs 100g.

In addition, the system 120, may also accept mal-ware binary files 100e. These include raw executable files that are malicious. Such files are run in a sandbox, on the system 120, in order to extract the characteristics of the malware, i.e. identifying the HTTP and DNS connections, and identifying the processes that were initiated, spawned or killed.

Similarly, pre-generated malware sandbox output files 100/may be accepted by the system 120 as well. Examples of commercial malware sandboxes include: Blue-coat and GFI.

In addition, the system 120, may also accept packet capture files (PCAPs) 100h. These files are network packets that are recorded for a short period of time.

Finally, system 120 may also accept regional Inter-net registry (RIR) data 100i. An RIR is an organization that manages the allocation and registration of Internet number resources within a particular region of the world. Internet number resources include IP addresses and autonomous system (AS) numbers.

Data Output

In one embodiment, when prompted, the automated service 120 may produce a detailed output listing Malice Scores and Malicious Components 180 as well as Network Risk Reports 190. Malice Scores may be numbers ranging from 0, indicating benign traffic, and 1, indicating malicious traffic. Malicious Components may include IP addresses, domain names, network blocks, and URLs. The service may also include a reason why such traffic was classified as malicious. Network Risk Reports may include an updated list of IPs, domains, and CIDRs that have high threat scores.

To offer an example, consider the following code which makes an API call to a fictitious threat detection service hosted at "XYZsecurity.com." If a user wanted to investigate the IP address 91.220.62.190 the user may issue the following command:
  https://api.XYZsecurity.com/intel_score/91.220.62.190

Once entered the IP addresses 91.220.62.190 is sent to the server 120. Subsequently the automated threat detection service 120 will respond 180 with the following information is displayed to the user:

{"CIDR_SCORE":"0.96",
"ASN_SCORE":"0.96",
"IP_SCORE":"0.96",
"RIR": "RI",
"ASN":"61322",
"ASN_DESC":"SOTAL-AS ZAO Sotal-Interactive",
"CIDR":"91.220.62.0/24",
[0042] "CC":"RU",
[0043] "IP":"91.220.62.190"}

The following is a brief description of each displayed parameter:

"CIDR_SCORE" represents the malicious score of the CIDR between 0 and 1 with 0 being benign and 1 being malicious.

"ASN_SCORE" represents the malicious score of the ASN between 0 and 1 with 0 being benign and 1 being malicious. "IP_SCORE" represents the malicious score of the IP address and can range between 0 and 1 with 0 being benign and 1 being malicious.

"RIR" identifies the Regional Internet Registry the IP belongs to. In this example "RI" is the abbreviation for RIPE which is the European registry.

"ASN" is the Autonomous System Number that the IP belongs to.

"ASN_DESC" is a textual description of the owner of the ASN.

"CIDR" is the network block that the IP belongs to. In this example the network block is "/24."

"CC" is the Country Code of where the IP resides. In this example "RU" stands for Russia.

"IP" is the IP address in question. In this example the address is of course "91.220.62.190."

Threat Identification and Detection Models

Figure 2:
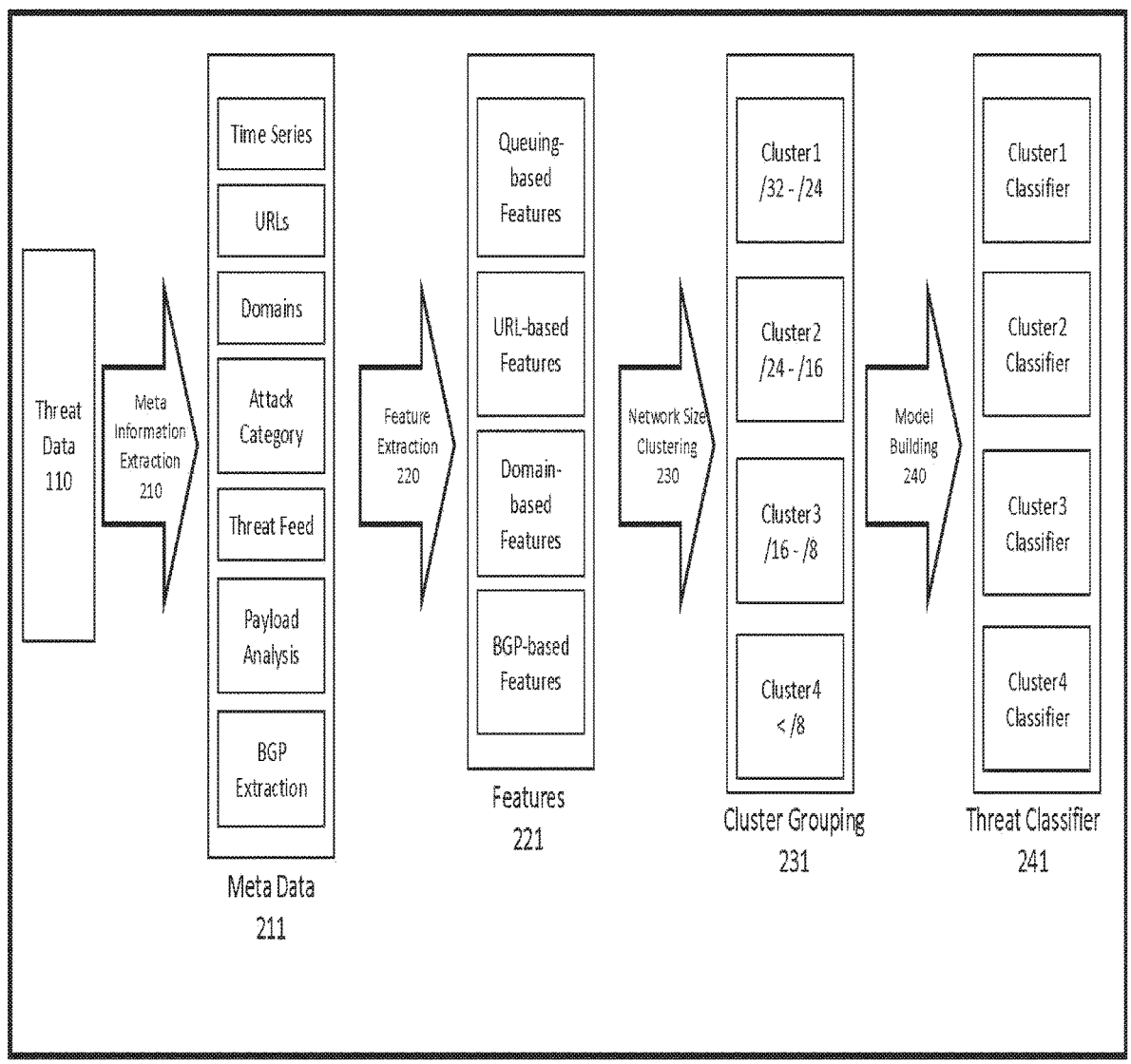
FIG. 2 illustrates an exemplary internet threat model generation scheme that is used to create a threat detection model.

FIG. 2 illustrates an exemplary internet threat data classification scheme that is used to create a threat detection model. In order to create a threat detection model 160 threat data 110 is fed into the data categorizer 130, of platform 120, where the network features trainer 200 processes the data in four stages: Meta Information Extraction 210, Feature Extraction 220, Network Size Clustering 230, and Model Building 240.

Meta Information Extraction

The Meta Information Extraction 210 stage comprises of constructing structured meta information from the un-structured threat data. The categorizer 130 may extract six core pieces of evidence from threat data 110: IP addresses, Timestamps of Attacks, URLs, Domain Names, Attack Category, and the Threat Feed that reported the attack.

Once the IP address is extracted it is fed it to a Boarder Gateway Protocol (BGP) extraction engine to find the network prefix (CIDR) and the Autonomous System (AS) that the IP maps to. In addition, this extraction provides the geo-location of the IP and the RIR that the IP belongs to.

Next, for every IP the categorizer 130 constructs a time series comprising all timestamps that an attack was reported on that IP. This log of timestamps is beneficial in extracting the queuing-based features in the Feature Extraction 220 stage. The attack categories may be grouped into five main attack categories:

1. Botnet Communication: This category may include IPs, domains, and URLs that are botnet C&Cs, config droppers, and malware droppers.
2. Phishing Threats: This category may include IPs, domains, and URLs that host a phishing attack.
3. Defacement Threats: This category may include IPs, domains, and URLs (if any) for defaced web servers.
4. Network Scanners: This category may include IPs that perform network scanning activities that are trying to find vulnerable servers on the Internet.
5. Malware Threats: This category may include IPs, domains, and URLs that host or drop malware.

The end product of the Meta Information Extraction 210 stage is a set of Meta Data 211 which is then used for Feature Extraction 220.

Feature Construction

In the Feature Extraction 220 stage the categorizer 130 extracts four categories of features: Queuing-Based Features, URL-Based Features, Domain-Based Features, and BGP-Based Features.

Queuing-Based Features

Queuing-Based Features are modeled on five components of a network: i) IP address, ii) Network block, also known as CIDR, iii) Autonomous System (AS), which is a group of CIDRs that have the same routing policy, iv) Country, which is the geolocation of the IP, and v) Regional Internet Registry (RIR), which is the region the IP resides in. Each of these components may be considered a "queue."

The rate at which attacks arrive at the network are considered the "infection rate." The rate in which they get taken down is considered the "departure rate." The duration of how long an attack stays on a network is the "service rate." The difference between arrival rate and the departure rate is the "network utilization."

It is assumed that attacks (infections) arrive to the queue, stay in the queue during the infection period, and finally get taken down, which is simply when the infection is cleaned. Thus there are five important properties of the queue:

1. Infection arrival rate ($\lambda$).
2. Infection service rate ($\mu$).
3. Network utilization, i.e. how busy is the queue ($p=\lambda i \mu$).
4. Average number of infections in the queue.
5. Average wait time of infection in queue.

URL-Based Features

URL-Based Features are extracted statistical features that capture the following patterns in URLs:

1. Entropy-based features: These cover the entropy of the URL, file name, and file extension in the URL.
2. Length-based entropies: Lengths of URL, directories, file name, and file extension.
3. Statistical-based features: These represent sum, max, min, median, mean, and standard divination of lengths, entropies, etc.
4. Categorial features: File extension type, domain TLD.

Domain-Based Features

Domain-based Features are extractions of the following attributes and aspects of domains:

1. Passive DNS features: Passive DNS is a historical replication of DNS data for IP addresses and domain names on the Internet. It can be acquired by monitoring DNS servers around the globe and recording all DNS requests that these servers issue. By doing this and with time, one builds huge historical information database that can map all domains and IPs addresses on the Internet. For example, one can find all the IPs that google.com pointed to at certain points in time. In addition, one can find all the domains that pointed to 74.125.239.101 at certain points in time.

2. Top-level-domain features: these includes counts, diversities, entropy features, etc.

3. Domain name entropy features: these can be a count of the number of characters and/or other statistical features, etc.

BGP-Based Features

BGP-based Features are features that are related to CIDRs and ASNs. The following features may be extracted per IP:

1. CIDR size, represented by the number of bits.
2. ASN size, represent by the accumulative number of CIDRs that have been announced by a particular AS.
3. BGP route length.
4. Flags indicating if the IP belongs to a hijacked route or prefix.

The following features are extracted per domain name:

1. Graph of all relative CIDRs.
2. Graph of relative ASNs.
3. Number of disconnected components in both graphs.

The end product of the Feature Extraction 220 stage is a set of Features 221, which are then clustered according to network size 230.

Clustering

In the Network Size Clustering 220 stage the categorizer 130 may use the k-means clustering algorithm to cluster the data (namely IPs, domains, and URLs) and features into four clusters depending on their CIDR size. This clustering step is necessary because larger networks cannot be modeled the same as small networks and thus the models need to be trained and classified independently. The clusters are determined as follows:

[0082] 1. Cluster 1: contains all data that belongs to CIDRs that are between [/32, /24).

[0083] 2. Cluster 2: contains all data that belongs to CIDRs that are between [/24, /16).

[0084] 3. Cluster 3: contains all data that belongs to CIDRs that are between [/16, /8).

[0085] 4. Cluster 4: contains all data that belongs to CIDRs that are between [/8, /0).

[0086] In practice it is often the case that the characteristics of Cluster 3 and Cluster 4 are similar enough that they may be combined into a single cluster [/16, /0) to save processing time, storage, and other computing resources.

Model Building and Training

In the Model Building 240 stage the categorizer 130 trains a Random Forest classifier for each of the clusters that were created in the previous section. To train the classifier we construct a training set that comprises a positive set and a negative set. The positive set contains malicious samples that the classifier needs to learn the patterns for. The negative set contains benign samples that the classifier needs to discriminate against. The data in the dataset corresponds to the features that were discussed in the previous sections.

Some features are represented based on whether or not they exist. For example, one feature can be if an IP belongs to cluster 5. This feature is represented as 1 or 0. The feature will be 1 if the IP belongs to cluster 5 and 0 if the IP does not belong to cluster 5. Other features are presented as numerical values. For example, one feature can be the total number of IPs in a network. Eventually the dataset can be thought of as a table, in which the rows comprise the sample points, which is in our case; IP addresses. And the columns are the features that we extracted for these IP addresses. Since we are dealing with a classification problem (i.e. classifying traffic into benign and malicious) the dataset must contain a column that shows the label of the data, which is simply if this IP is benign (0) or malicious (1).

To evaluate the classifier that was built in the previous step, the training set may be divided into two sets: a training set and a test set. The test set is used to evaluate the performance of the classifier (the performance in terms of detection not speed). Based on the detection of the sample data in the test set, one can evaluate the accuracy of the classifier, the error rate, the false positive rate, and the false negative rate.

Figure 8:
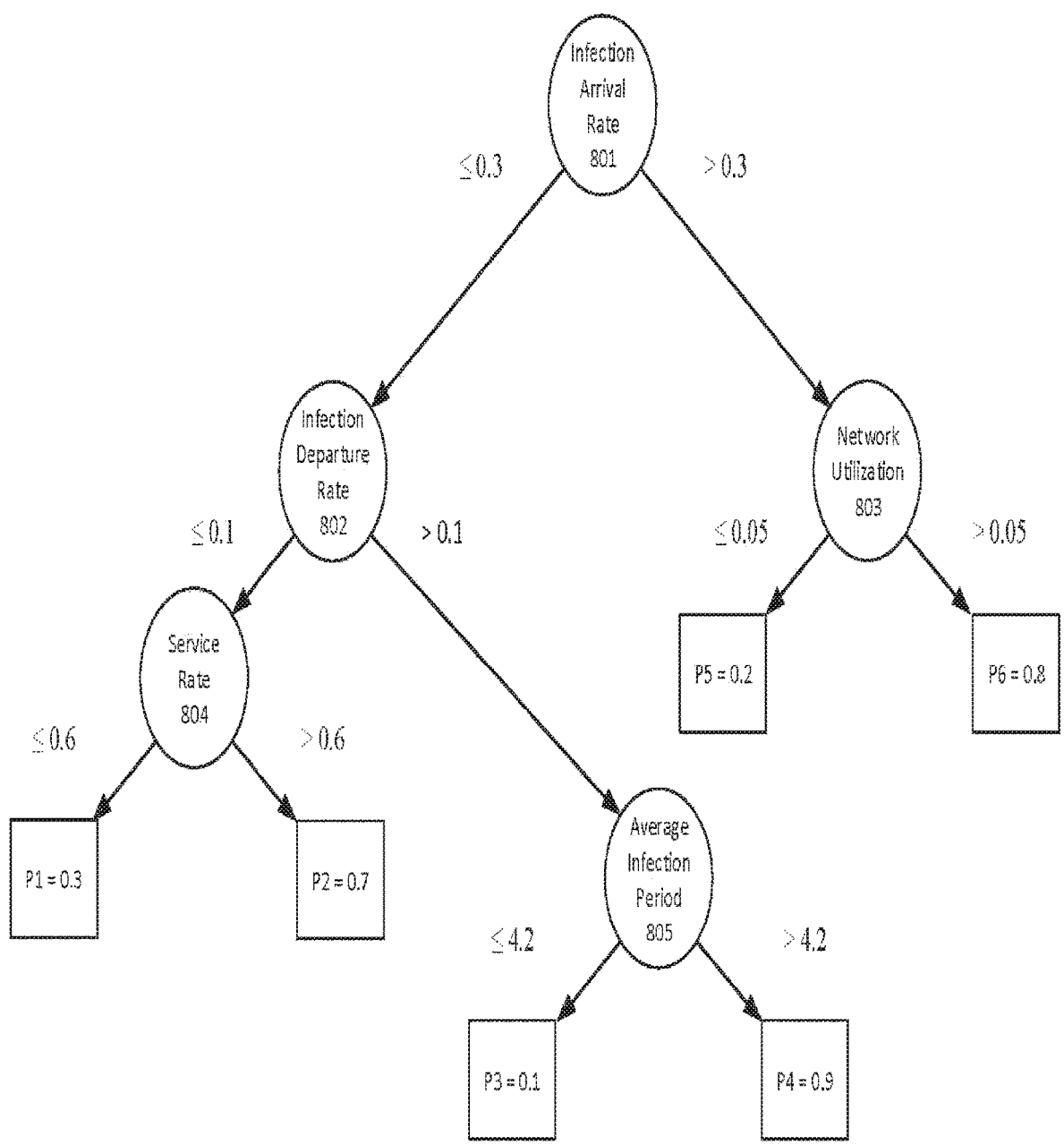
FIG. 8 is a decision tree that illustrates how the infection rate and infection duration in a network may be used to determine the likelihood of the maliciousness of the network.

FIG. 8 is a decision tree that illustrates how the infection rate and infection duration in a network may be used to determine the likelihood of the maliciousness of the network. As an example, in one embodiment the system, if the infection arrival rate 801 is greater than 0.3/day and the network utilization ratio 803 is greater than 0.05 then the probability of that this node is infected is 80%, otherwise the probability is 20%. Similarly if the infection arrival rate 801 is less than 0.3/day and the infection departure rate 802 is greater than 0.1/day and also the average infection period 805 is greater than 4.2/day the probability that the node is infected is 90%, otherwise it is 10%. Finally if the infection arrival rate 801 is less than 0.3/day and the infection departure rate 802 is less than 0.1/day and also the service rate 804 is greater than 0.6 days the probability that the node is infected is 70%, otherwise it is 30%. It should be noted that the numerical values for the duration and probabilities illustrated in FIG. 8 are merely examples and are not meant to be taken literally. In practice the actual values and weights representing the significance of these features will be determined and updated every time a model is trained and built.

[0091] The end product of the Model Building 240 stage is a set of trained Threat Classifiers 241 for each Cluster Grouping 231. These classifiers exist as trained models 160 that may later be compared against future internet data 110 in order to identify and detect potential threats.

Threat Identification and Detection Engine

Figure 3A:
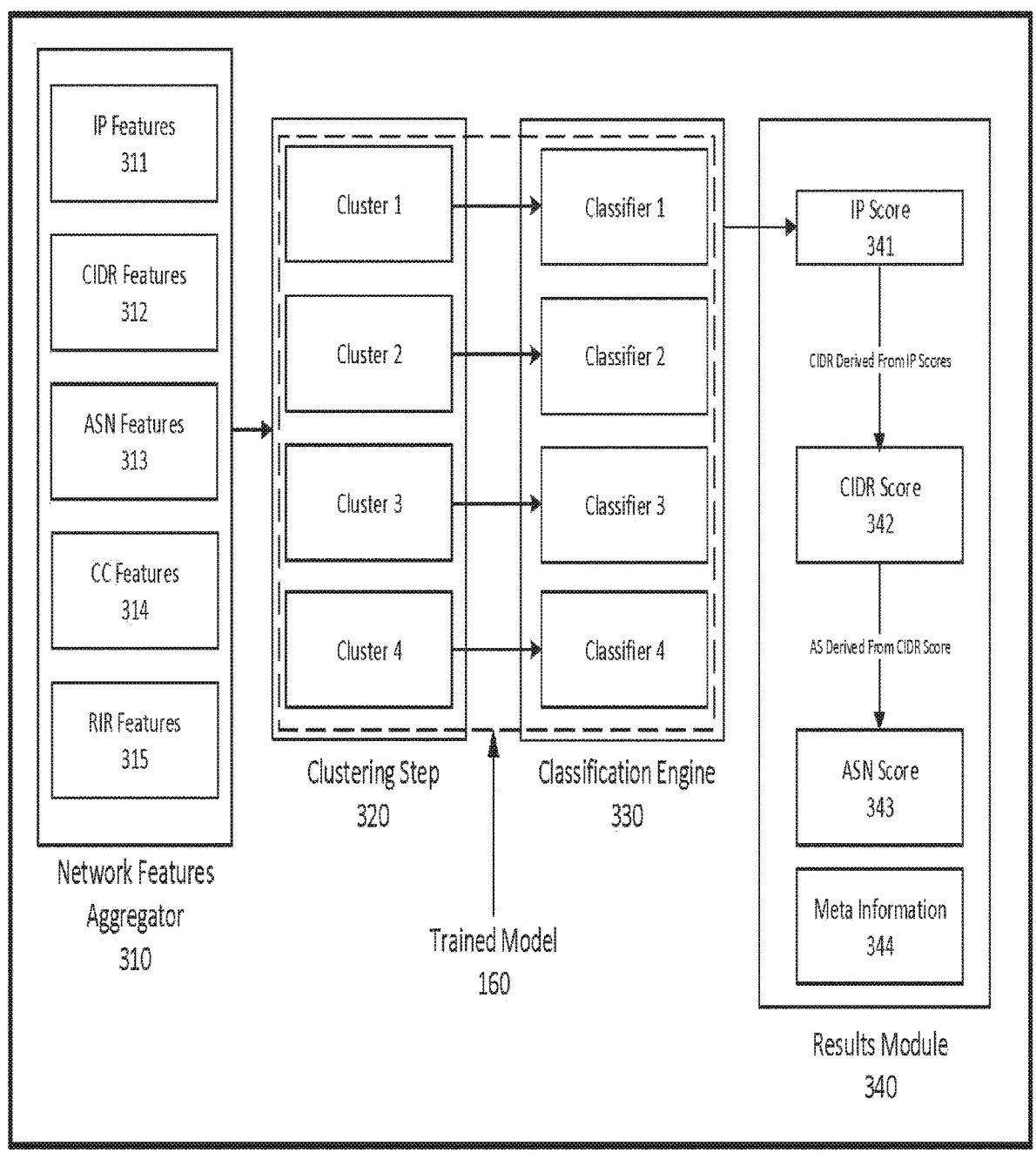
FIG. 3A illustrates an exemplary threat detection engine and threat score generator.

Once models 160 are trained by the network feature trainer 200 they may be used by an attack ID and detection engine 300 to analyze potential threats. FIG. 3A illustrates an exemplary threat detection engine and threat score generator. A network features aggregator 310 collects all the important features—the relevance of which is deter-mined by the trained model 160-related to IP 311 CIDR 312 ASN 313 CC 314 and RIR 315. These features then undergo a clustering step 320 in which the features are grouped by the network size clusters they pertain. The clustered features are then run through their respective classifiers in a classification engine 330. The comparison of the aggregated features 310 with the trained models 160 in the classification engine 330 results in an IP score 341 which represents the maliciousness of that particular IP. This IP score 341 may then be used to derive a CIDR score 342 which in turn may be used to derive an ASN score 343. These scores along with any meta information 344 about the IP under investigation may be displayed to the user via a results module 340.

Figure 3B:
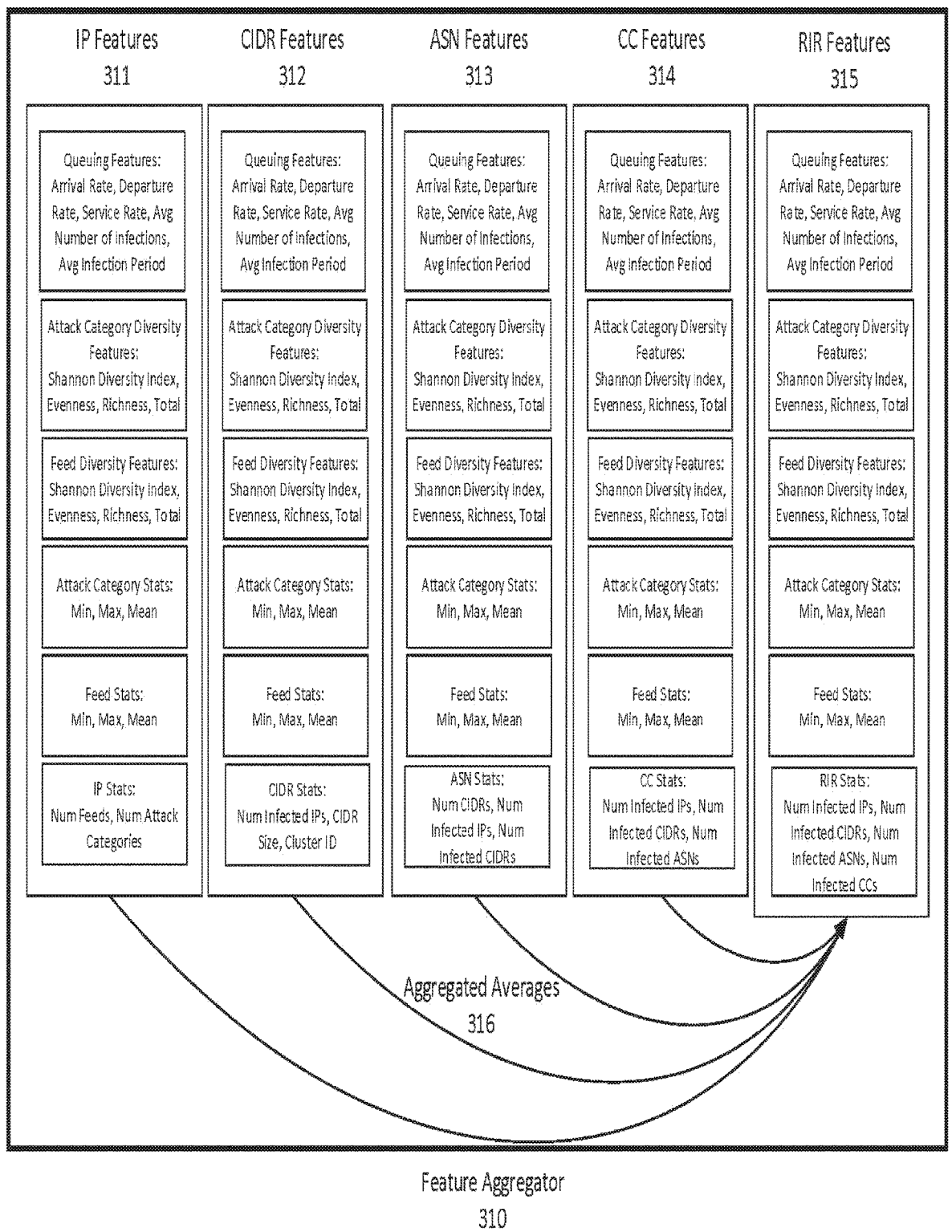
FIG. 3B illustrates a features aggregator with various feature categories and sub-categories.

FIG. 3B illustrates a network features aggregator 310 with various feature categories 311-315 and sub-categories. Each feature category 311-315 may comprise of sub-categories such as Queuing Features, Attack Category Diversity Features, Feed Diversity Features, Attack Category Stats, and Feed Stats.

[0094] The IP Features 311 category may further comprise of IP Stats which include the number of threat feeds that list the IP and the number of attack categories the IP falls under. The CIDR Features 312 category may further comprise of CIDR Stats which include the CIDR size, the number of infected IPs within the CIDR, and the cluster ID. The ASN Features 313 category may comprise of ASN Stats including the number of CIDRs within the ASN, the number of infected IPs within each CIDR, and thus the number of infected CIDRs. The CC Features 314 category may further comprise of CC Stats including the number of infected IP's, thus the number of infected CIDR's, and thus the number of infected ASN's. The RIR Features 315 category may comprise of RIR Stats including the number of infected IP's, thus the number of infected CIDR's, thus the number of infected ASN's, and thus the number of infected CC's.

Since the listed feature categories 311-315 follow a hierarchy (i.e. IPs reside on CIDRs, which reside within ASNs, which further reside within CCs, which finally exist within RIRs) the aggregated averages 316 of some of features in one feature category may be used to estimate the stats in another feature category. For example FIG. 3B illustrates how, within the RIR Features 315 category, the statistics related to the number of infected IPs, CIDRs, ASNs, CCs may be determined by taking the averages of these said statistics from other feature categories 311-314.

Threat Prediction Models

Figure 4:
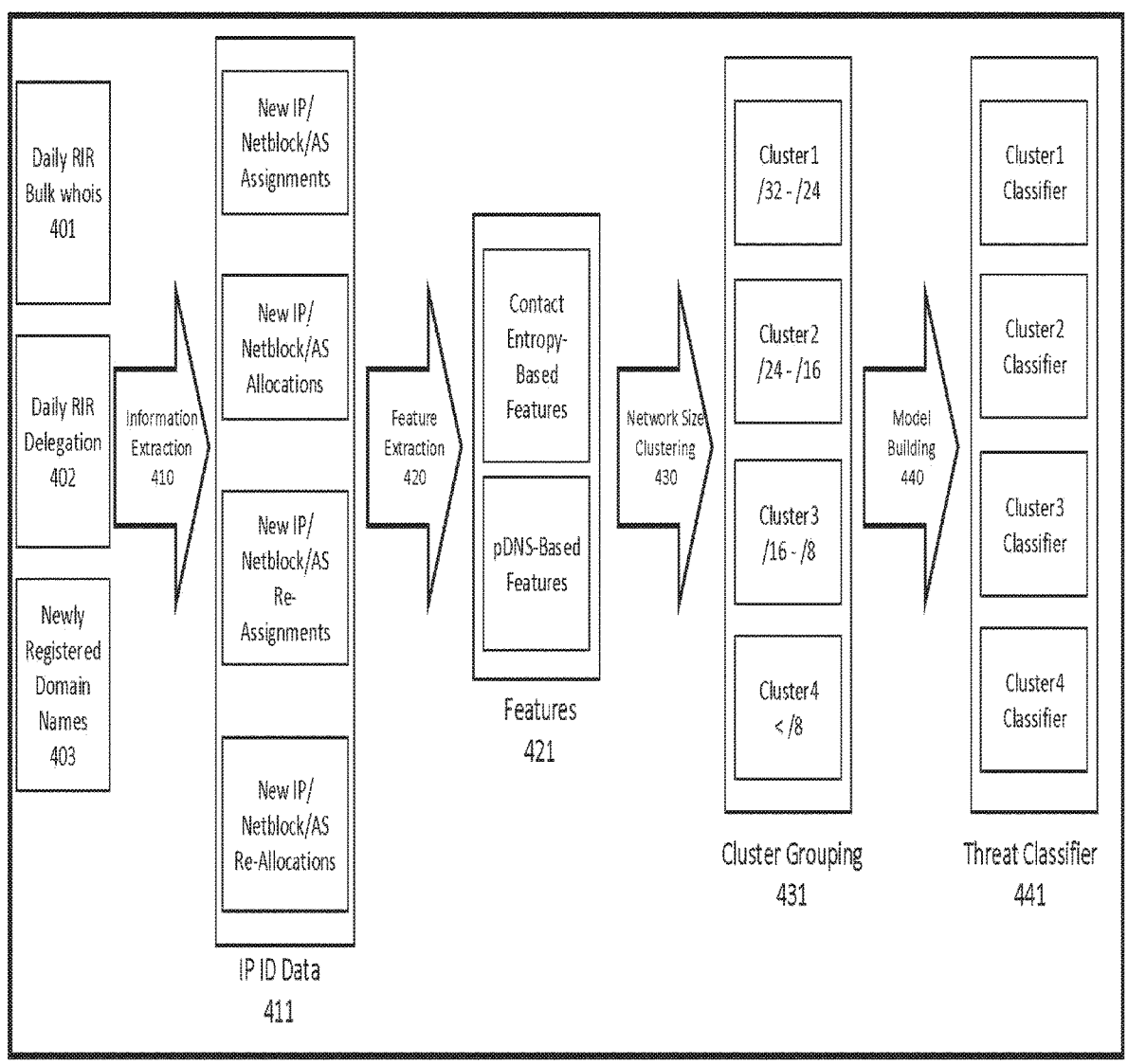
FIG. 4 illustrates an exemplary IP registry classification scheme that is used to create a threat prediction model.

FIG. 4 illustrates an exemplary IP registry classification scheme that is used for creating a threat prediction model. Similar to how threat detection models 160 were created, in order to create a threat prediction model 170 threat data 110 is fed into the data categorizer 130, of platform 120, where the RIR features trainer 400 processes the data in four stages: Information Extraction 410, Feature Extraction 420, Network Size Clustering 430, and Model Building 440.

Information Extraction

The Information Extraction 410 stage comprises of first receiving daily information about IP 401 and network assignments, reassignments, allocations, reallocations 402 and newly registered domain names from top level domain (TLD) zone files 403. This information is acquired through the five RIRs, i.e. ARIN, RIPE, APnic, AFRinic, and LACnic. At this stage the categorizer 130 identifies the individuals or groups that the IPs or network blocks were assigned to 411.

Feature Construction

In the Feature Extraction 420 stage the categorizer 130 extracts 2 categories of features: Contact Entropy Based Features and pDNS Based Features.

Contact Entropy Based Features

Contact Entropy Based Features are features used to detect network blocks that will be used by, threat actors. The threat actors use anonymous or private registration information when they register for reassigned network blocks. Thus in order to identify these malicious actors the entropy of the registration information for newly assigned network blocks are features that need to be aggregated and correlated. Suspicious networks will likely have higher entropy.

pDNS Based Features

The system further finds passive DNS (pDNS) evidence on the IPs that were identified in the registration information from the previous feature. The system further calculates pDNS features on the IPs and domains that are retrieved from the previous step. Then the system correlates the domains and IPs with a malware DB to find which IPs and domains were associated with malware in the past. Finally the system calculates maliciousness scores for all IPs and domains that it gets from the pDNS evidence.

Clustering and Model Building

In a manner analogous to how threat detection models 160 were generated in the earlier example these datasets are also grouped into clusters 430 depending on the CIDR size and analyzed by their respective cluster classifiers 440.

The end product of the Model Building 440 stage is a set of trained Threat Classifiers 441 for each Cluster Grouping 431. These classifiers exist as trained models 170 that may later be compared against future internet data 110 in order to predict potential threats.

Threat Prediction Engine

Figure 5A:
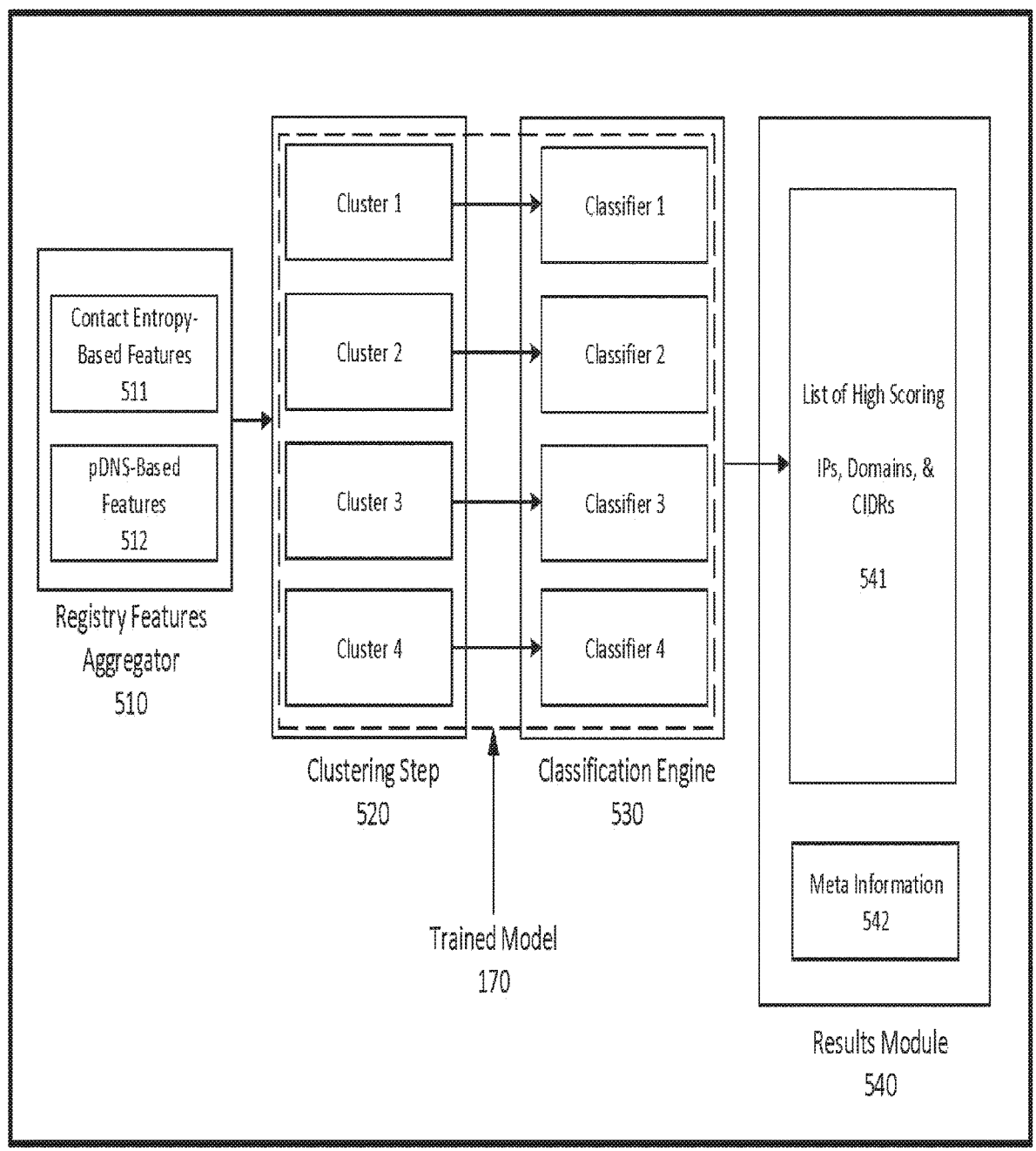
FIG. 5A illustrates an exemplary threat prediction engine and threat list generator.

Once models 170 are trained by the network feature trainer 400 they may be used by an attack prediction engine 500 to analyze potential threats. FIG. 5A illustrates an exemplary threat prediction engine and threat list generator. A registry features aggregator 510 collects all the important features—the relevance of which is determined by the trained model 170-related to contact entropy 511 pDNS 512. These registrations then undergo a clustering step 520 in which the features are grouped by the network size clusters they pertain. The clustered registrations are then run through their respective classifiers in a classification engine 530. The comparison of the aggregated features 510 with the trained models 170 in the classification engine 530 results in a list of high scoring IPs, domains, and CIDRs 541 which represent the maliciousness of those respective networks. These scores along with any meta information 344 about the networks of interest may be displayed to the user via a results module 340.

Figure 5B:
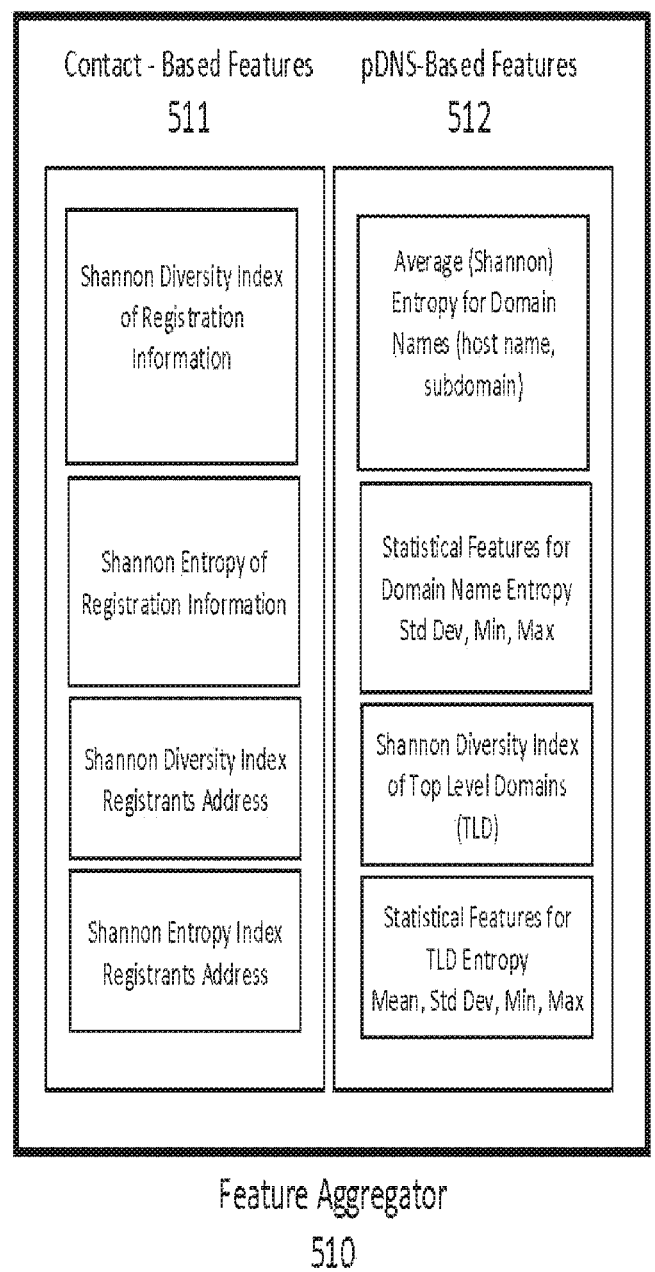
FIG. 5B illustrates a features aggregator with various feature categories and sub-categories.

FIG. 5B illustrates a registry features aggregator 510 with various feature categories 511-512 and sub-categories. Each feature category 511-512 may comprise of sub-categories such as Contact-Based Features and pDNS-Based Features.

The Contact-Based Features 511 category may further comprise of sub-categories including Shannon Diversity Index of Registration Information, Shannon Entropy of Registry Information, Shannon Diversity Index of Registrants Addresses, and Shannon Entropy Index of Registrants Addresses.

The pDNS-Based Features 512 category may further comprise of sub-categories including Average Shannon Entropy for Domain Names, Statistical Features for Domain Name Entropy (e.g. min, max, standard deviation of entropy), Shannon Diversity Index of Top Level Domains, and Statistical Features for Top Level Domains Entropy (e.g. min, max, mean, standard deviation of entropy).

Threat Correlation Classifier

Figure 6:
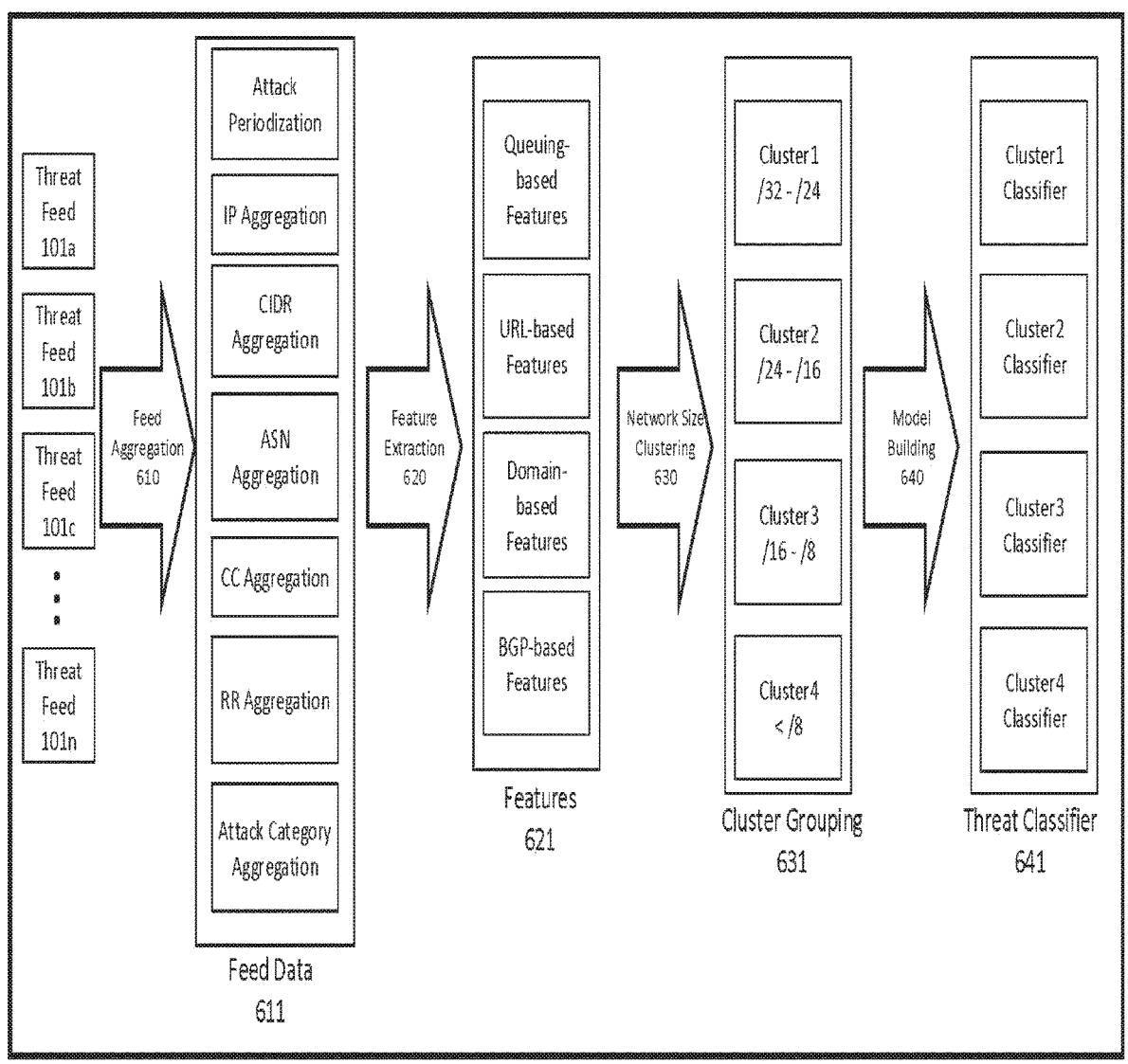
FIG. 6 illustrates an exemplary multiple threat feed classifier that is used to extract and correlate suspicious features from multiple sources in order to improve threat detection and prediction models.

FIG. 6 illustrates an exemplary multiple threat feed classifier that is used to extract and correlate suspicious features from multiple sources in order to detect and predict threats. The automated threat detection system 120 can be used as a threat correlation classifier 600 that will aggregate several threat feeds. If these feeds contain noisy data, false positives, or duplicates, the system 120 normalizes and cleanses these threat feeds.

In order to build a model for correlation, the system must be fed with the same six entities that are extracted in the network features trainer 200. The correlation classifier 600 then periodizes the timestamps of the various attacks in the different feeds. This is done by grouping and aggregating 610 IP address, CIDR, ASN, CC, and RIR information in all of these feeds. Then on every IP, CIDR, ASN, CC, and RIR the classifier 600 groups the attacks by their categories. The classifier 600 then periodizes attacks on each of these entities by their attack category.

Next the classifier 600 extracts features 620 on all six entities similar to the steps we followed in the network features trainer 200. The classifier 600 then performs the familiar a clustering step 630 and then builds models 640 for the four clusters. The models that were generated in this process are then used to score all the threat data from all threat feeds 100a-n. Finally, the classifier 600 defines a threshold, as a cutoff point, to select which data will be used in the normalized (cleansed) threat feed and which data will be discarded.

Figure 7:
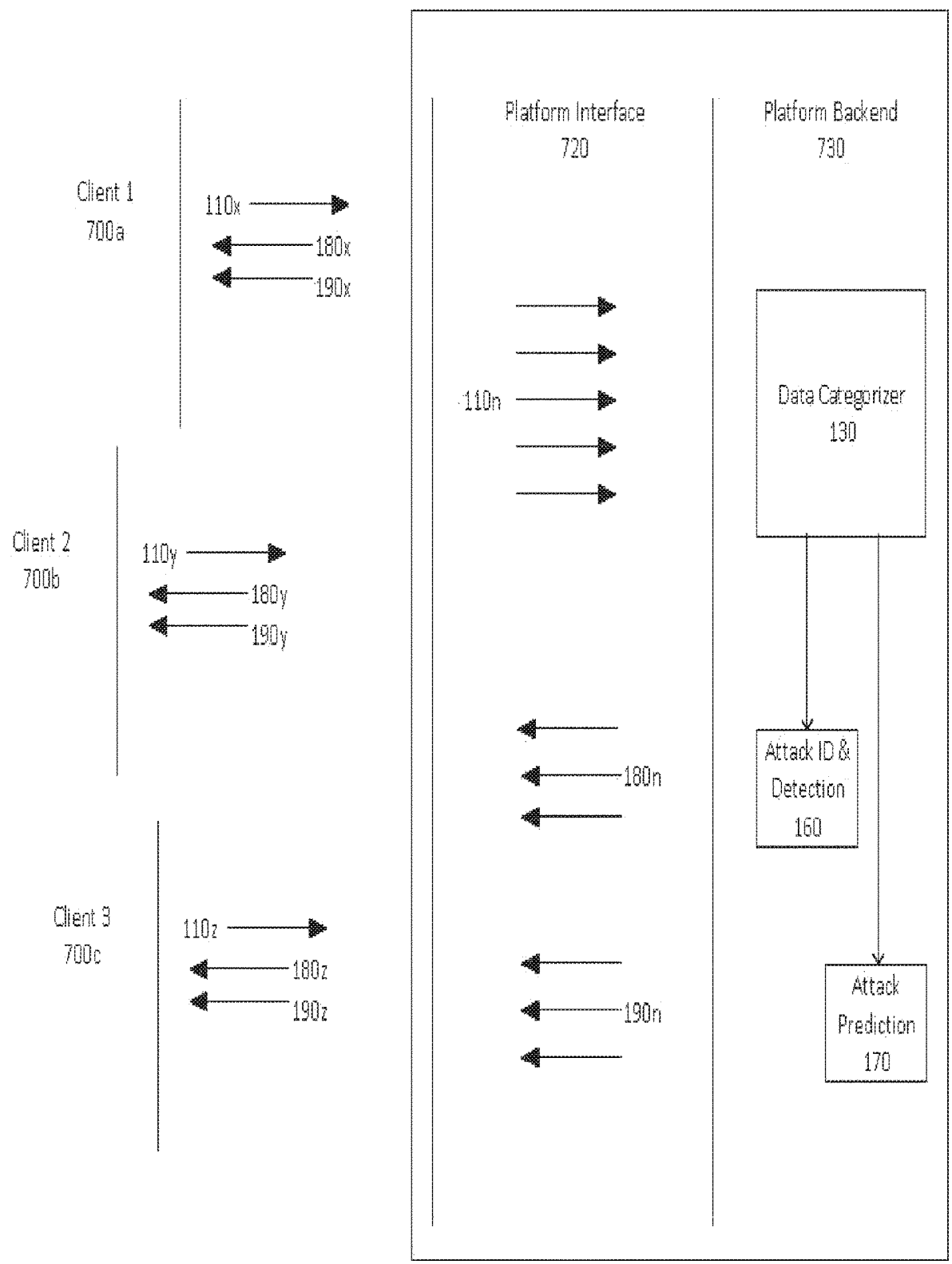
FIG. 7 illustrates the interaction between multiple clients and a machine learning service in which data from the multiple clients is correlated in order to better identify, detect, and predict online attacks.

FIG. 7 illustrates the interaction between multiple clients 700a-c and a machine learning service 710 in which data from the multiple clients is correlated in order to better identify, detect, and predict online attacks.

For example, in one embodiment, clients 700a-c may send input data 110x-z, respectively, to machine learning service 710. The platform interface 720, of machine learning service 710, may then aggregate the input data 110n from multiple sources and feed it into the data categorizer 130 of the platform backend 730. Data categorizer 130 may then extract features from the aggregated input data 110n and feed them into attack ID and detection engine 160 and attack prediction engine 170. Engines 160 and 170 may then output aggregated threat scores 180n and aggregated threat lists 190n, respectively, to the platform interface 720. The platform interface 720 may then forward the relevant scores 180x-z and lists 190x-z to clients 700a-c, respectively. Platform interface 720 may determine which information to forward based on each respective clients' 700a-c preferences, requirements, network characteristics and input data 110x-z.

This method of aggregating input data 110x-z from multiple clients 700a-c is particularly useful because it allows for a machine learning service 710 to determine the commonalities and differences between the unique data sets 110x-z and thus train more extensive models that better represent the variability of malicious activity on the internet.

Hardware Limitations

Naturally, in order to process the requisite amount of data, the present invention requires significant hardware resources to operate. To deploy an instance of the analytics engine that supports up to 100 active users, the automated threat detection service 120 requires, at a minimum, the following hardware specifications: A CPU with 8 cores, each operating at 2.0 GHz; 32 GB of RAM; and 50 GB of free HDD space. While the system 120 at times may be functional with less resources the requirements specified above should be scaled according to the number of users for effective performance.

Updates

As with any automated services the platform 120 will sometimes misclassify legitimate traffic as malicious (also known as false positives) or classify malicious traffic as legitimate (also known as false negatives). While these incidents should be rare, the present invention may require a mechanism to feed these misclassifications to the platform 120 so that its classifiers can be retrained. This may be done simply by pushing a configuration file update to the platform 120. This configuration file may contain amendments to a classifier model or alternatively include an entirely new retrained model.

Glossary

1. Features: Unique attributes that are extracted from raw data. This can either be a statistical, categorical, or numerical representation.
2. Feature Construction: The act of generating features from raw data.
3. Feature Set: Group of features that are associated with observation of the actual data. Such a set can be labeled or unlabeled.
4. Training: Learning patterns in a feature set.
5. Supervised Learning: Training a system when the data is labeled.
6. Unsupervised learning: Training a system data is unlabeled.
7. Clustering: Unsupervised learning system, via the application of an algorithm, that can learn patterns in data. The data set is then divided into related clusters.
8. Classifier: Supervised learning system, via the application of an algorithm, than can learn patterns in data or a feature set. The data is assigned the closest label in the feature set.
9. Model: The generated object (or output) of a classifier. A "trained model" is a model that has gone through a classifier.
10. Engine: System accepts user input and applies it to a trained model to provide an output.
11. Training Set: Part of the data corpus that is used to build a model.
12. Test Set: Part of the data corpus is used to verify the accuracy of the model. Test set data is already labeled and verified.
13. Testing/Validation: Testing the accuracy of the model by comparing known labels of a test set with the output of the model.
14. Platform: A software service that comprises servers, clients, API, dashboards, or web portals.

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of components, properties such as orientation, location, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A method for alerting a client system of a potential malware threat, comprising:
   receiving a first set of network traffic data comprising past internet threat data;
   building a threat detection model by:
      extracting a first set of network related features from the first set of network traffic data, wherein the first set of network related features comprises one or more queueing-based features that include an infection arrival rate and an infection service rate;
      clustering the first set of network related features based on their network size;
      training a respective threat classifier for each cluster of the first set of network related features by (i) constructing a first training set that comprises a first positive set and a first negative set, wherein the first positive set comprises first malicious samples and the first negative set comprises first benign samples, and (ii) detecting patterns in the first malicious samples based at least in part on the infection arrival rate being greater than or less than a first threshold rate and the infection service rate being greater than or less than a second threshold rate;
      evaluating accuracy of each of the respective trained threat classifiers of the threat detection model on a test data set;
   building a threat prediction model by:
      extracting a first set of registry related features from the first set of network traffic data, wherein the first set of registry related features comprises at least one of a contact entropy-based feature and a passive domain name system (pDNS)-based feature;
      clustering the first set of registry related features based on their network size;
      training a respective threat classifier for each cluster of the first set of registry related features by (i) constructing a second training set that comprises a second positive set and a second negative set, wherein the second positive set comprises second malicious samples and the second negative set comprises second benign samples, and (ii) detecting patterns in the malicious samples based at least in part on one or more of an entropy-based feature and a pDNS-based feature;
      evaluating accuracy of each of the respective trained threat classifiers of the threat prediction model on the test data set;
   receiving a second set of network traffic data comprising contemporaneous internet data including IP address data;
   extracting a second set of network related features and a second set of registry related features from the second set of network traffic data;
   clustering the second set of network related features and the second set of registry related features based on their Classless Inter-Domain Routing (CIDR) size;
   comparing each cluster of the second set of network related features to a respective threat classifier of the respective trained threat classifiers of the threat detection model to determine a malice score for each IP address in the IP address data included in the second set of network traffic data;

comparing each cluster of the second set of registry related features to a respective threat classifier of the respective trained threat classifiers of the threat prediction model to generate a predictive threat list of IP addresses in the second set of network traffic data that are likely to be used in future attacks; and alerting the client system of the predictive threat list and the determined malice score for each IP address in the IP address data.

2. The method of claim 1, wherein the first set of network related features comprises at least one of an Internet Protocol (IP) address, an identified attack timestamp, a Universal Record Locator (URL), a meta-information cluster, and a domain name.

3. The method of claim 2, wherein the step of extracting the first set of network related features further comprises at least one of using the IP address to determine a network queue, using the URL to determine URL-based features, and using the domain name to determine domain-based features.

4. The method of claim 3, wherein the step of extracting the first set of network related features further comprises using the identified attack timestamp on the network queue to determine the one or more queuing-based features.

5. The method of claim 3, wherein the URL-based features include at least one of an entropy of the URL and a length of the URL.

6. The method of claim 3, wherein the domain-based features include historical replication of Domain Name System (DNS) data for at least one of the IP address and the domain name.

7. The method of claim 1, wherein the step of clustering the first set of network related features based on their network size comprises clustering the first set of network related features based on their CIDR size.

8. The method of claim 2, wherein at least one of the first set of network traffic data and the second set of network traffic data further comprises a meta-information cluster.

9. The method of claim 8, wherein the meta-information cluster comprises at least one of a time series, an IP address feature, an attack category, a threat feed, a payload analysis, a contact entropy-based feature, a Passive DNS (pDNS) based feature, and a Boarder Gateway Protocol (BGP) extraction-based feature.

10. The method of claim 9, wherein the IP address feature comprises at least one of an IP assignment, an IP allocation, an updated IP assignment, and an updated IP allocation.

11. The method of claim 10, wherein the IP assignment is different than the updated IP assignment.

12. The method of claim 10, wherein the IP allocation is different from the updated IP allocation.

13. The method of claim 9, further comprising applying the BGP extraction-based feature to the threat detection model to assist in determining a malicious score for an IP address in the second set of network traffic data features.

14. The method of claim 9, wherein the BGP extraction-based feature comprises at least one of a CIDR size, an Autonomous System Number (ASN) size, a BGP route length, and a hijack flag.

15. The method of claim 14, wherein the hijack flag is configured to indicate at least one of a hijacked route or hijacked prefix with respect to the first set of network traffic data.

16. The method of claim 1, wherein the queuing-based features include at least one of an infection departure rate and a network utilization, wherein the network utilization is the difference between the infection arrival rate and the infection departure rate.

17. The method of claim 1, wherein the threat detection model comprises a plurality of trained threat classifiers for each cluster of the first set of network traffic data.

* * * * *